United States Patent
Oppenländer et al.

(10) Patent No.: US 6,413,445 B1
(45) Date of Patent: Jul. 2, 2002

(54) ANTIFREEZE CONCENTRATES AND COOLANT COMPOSITIONS CONTAINING THESE CONCENTRATES FOR COOLING CIRCUITS IN INTERNAL COMBUSTION ENGINES

(75) Inventors: Knut Oppenländer, Ludwigshafen; Wolfgang Günther, Mettenheim; Klaus Pfitzner, Ludwigshafen; Michael Gillich, Mutterstadt; Ladislaus Meszaros, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/720,255

(22) PCT Filed: Jul. 8, 1999

(86) PCT No.: PCT/EP99/04819

§ 371 (c)(1),
(2), (4) Date: Jan. 9, 2001

(87) PCT Pub. No.: WO00/02974

PCT Pub. Date: Jan. 20, 2000

(30) Foreign Application Priority Data

Jul. 9, 1998 (DE) ........................................ 098 30 819

(51) Int. Cl.$^7$ ............................ C09K 5/20; C23F 11/16
(52) U.S. Cl. ......................... 252/78.1; 252/70; 252/71; 252/77
(58) Field of Search .......................... 252/70, 71, 78.1, 252/77

(56) References Cited

U.S. PATENT DOCUMENTS

| | | | |
|---|---|---|---|
| 4,241,011 A | 12/1980 | Wilson et al. | 422/13 |
| 4,647,392 A | 3/1987 | Darden et al. | 252/78 |
| 4,759,864 A | 7/1988 | Van Neste et al. | 252/75 |
| 5,085,793 A | 2/1992 | Larkin et al. | 252/79 |

FOREIGN PATENT DOCUMENTS

WO    WO 96/18757    6/1996

OTHER PUBLICATIONS

Derwent Abstract No. 1993–402174, abstract of The Republic of Korea Patent Specification No. 9304145 (May 1993).*
Derwent Abstract No. 1996–048275, abstract of Romanian Patent Specification No. 109660 (Apr. 1995).*

* cited by examiner

Primary Examiner—Anthony Green
(74) Attorney, Agent, or Firm—Oblon, Spivak, McClelland, Maier & Neustadt, P.C.

(57) ABSTRACT

A description is given of antifreeze concentrates which comprise
 a) at least one water-miscible alcohol which lowers the freezing point;
 b) at least one corrosion inhibitor; and
 c) as reserve alkalinity donor, at least one mono- or polycyclic aromatic compound which has at least one hydroxyl group and a high buffer capacity in the pH range from about 6 to 10
and of coolant compositions which comprise said concentrates and are intended for the cooling circuits in internal combustion engines.

10 Claims, No Drawings

ANTIFREEZE CONCENTRATES AND COOLANT COMPOSITIONS CONTAINING THESE CONCENTRATES FOR COOLING CIRCUITS IN INTERNAL COMBUSTION ENGINES

The present invention relates to novel antifreeze concentrates based on alkylene glycols and to ready-to-use aqueous coolant compositions which comprise said concentrates and are intended for cooling circuits in internal combustion engines.

Coolants for the cooling circuits of internal combustion engines, such as in motor vehicles, generally include alkylene glycols, especially ethylene glycol or propylene glycol, or else corresponding glycol ethers. For use in the cooling system they are diluted with water and are intended not only to provide frost protection by lowering the freezing point of water but also to contribute toward good heat dissipation. Alkylene glycol/water mixtures, however, are extremely corrosive at the operating temperatures of internal combustion engines and so the various metals used to construct cooling systems must be protected against corrosion.

As far as thermal loading of the heat transfer areas, pressure, flow rate, and the selection of materials are concerned, the operating conditions in modern internal combustion engines nowadays place much greater demands on the corrosion prevention capacity of the coolant than was hitherto the case. In addition to the known materials such as copper, brass, soft solder, steel, and grey cast iron, there is also increasing use of alloys of aluminum for the purpose, in particular, of weight reduction. Consequently, there is increased occurrence in more recent literature of descriptions of specific combinations of long-known active substances, each claimed to have a specific spectrum of action.

In particular, alkali metal silicates have been found excellent for protecting aluminum against corrosion. In glycol-based radiator protectants, however, they tend to form gels or even to precipitate, so creating a need for special silicate stabilizers.

Examples of constituents of such combinations of active substances include salts of organic acids which, especially in the form of their alkali metal salts, are efficient corrosion inhibitors, whereas the free acids are less effective or may even be corrosive. The incidence of free acids in radiator protectant formulations as a possible result, for example, of oxidation processes or the ingress of nitrous gases into the cooling system is therefore highly undesirable. It is for this reason that radiator protectant formulations contain small amounts of agents known as reserve alkalinity donors which have a buffer action in the relevant pH range and so prevent the formation of free acids. Examples of compounds employed as reserve alkalinity donors are amines and phosphates and, in particular, the less expensive borax. Such corrosion inhibitor compositions are described, for example, in EP-B-0 229 440 and EP-A-0 308 037.

Because of the above-described disadvantages associated with the use of silicates as corrosion inhibitors for aluminum, in recent developments a trend has been noted to omit them and instead use other active substances. Under these conditions, however, the reserve alkalinity donor, borax, is highly corrosive, and so can no longer be used. The use of phosphates in modern-day radiator protectant formulations is likewise undesirable. This applies to an even greater extent to amines, on the basis of their characterization as potential nitrosamine formers.

WO-A-96/18757 describes anticorrosion compositions for temporarily protecting metallic surfaces, especially those comprising iron, against corrosion. Said compositions are aqueous solutions comprising a combination of a carboxylic acid anion of 6 to 44 carbon atoms with an aromatic hydroxy compound having a $pK_a$ for the hydroxyl group in the range from 7.0 to 11, in a weight ratio of from 1:2 to 20:1. Corrosion inhibitor systems of that kind, however, are not intended for use in alkylene glycol-containing coolant systems for internal combustion engines. Instead, it is proposed that they be used in aqueous treatment baths in which the articles to be treated—for example, steel sheets—are dipped.

Consequently, there continues to be a need for improved antifreeze concentrates.

It is an object of the present invention to provide silicate-free antifreeze concentrates which comprise new reserve alkalinity donors and are unhampered by the disadvantages described above. The antifreeze concentrates should in particular exhibit enhanced corrosion inhibition on aluminum or its alloys.

We have found that this object is achieved by taking conventional silicate-free inhibitor systems for alkylene glycol-containing radiator protectant formulations and replacing the customary reserve alkalinity donors, such as borates, phosphates and amines, by a mono- or polycyclic aromatic compound which has at least one hydroxyl group and a high buffer capacity in the pH range from about 6 to 10.

The present invention therefore provides, in particular, antifreeze concentrates which comprise
a) at least one water-miscible alcohol which lowers the freezing point, preferably selected from alkylene glycols and alkylene glycol ethers;
b) at least one corrosion inhibitor; and
c) as reserve alkalinity donor, at least one mono- or polycyclic aromatic compound which has at least one hydroxyl group and a high buffer capacity in the pH range from about 6 to 10.

Such antifreeze concentrates and the ready-to-use coolant compositions prepared with them have the surprising advantage over conventional formulations of a markedly better corrosion-inhibiting effect. In particular, an improvement is observed in the corrosion stability of aluminum materials, as used in engine construction.

In one preferred embodiment the antifreeze concentrates of the invention comprise as reserve alkalinity donor at least one compound of the formula I

where
Ar is a radical of the formula II

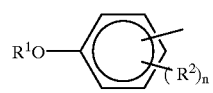

where
n is an integer from 0 to 4 and
R$^1$ is hydrogen or an alkali metal ion, and the substituents R$^2$ independently of one another are a hydroxyl, alkyl, hydroxyalkyl, heteroalkyl or hydroxyheteroalkyl group, and
X is —COOH, —SO$_3$H or —SO$_2$Ar, where Ar is as defined above.

Preferred compounds of the formula I include Ar radicals of the formula II where n is 0, 1 or 2. The ring substituents $R^2$, where present, are preferably and independently of one another hydroxyl or hydroxyalkyl groups. The radical X is preferably —SO$_2$Ar, where Ar can be as defined above.

A reserve alkalinity donor which is particular preferred in accordance with the invention is selected from compounds of the formula III

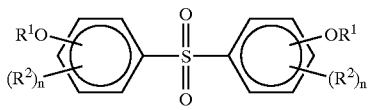

(III)

where $R^1$, $R^2$ and n independently of one another are as defined above. In compounds of formula III $R^1$ is preferably hydrogen, n is preferably 0, 1 or 2 and $R^2$, if present, is preferably hydroxy or hydroxyalkyl. Compounds of the formula III are preferably symmetrical; that is, the two aromatic rings are substituted mirror-symmetrically starting from the central SO$_2$-group.

Particular preference is given to compounds of the formula III where the radicals $R^1$ are identical and are hydrogen or an alkali metal and n in each case is 0. Specific examples of such compounds are 4,4'-dihydroxydiphenyl sulfone (bisphenol S) and the corresponding positional isomers, and also mixtures of these compounds.

Where $R^1$ in the abovementioned compounds of the formula I is not hydrogen, it is a preferably monovalent metal cation, especially an alkali metal cation such as, for example, a sodium or potassium cation. Where two or more radicals $R^1$ are present, they are preferably the same alkali metal cation.

Alkyl radicals suitable in accordance with the invention are straight-chain or branched carbon chains having 1 to 10, preferably 1 to 6 and, in particular 1 to 4 carbon atoms. Examples that may be mentioned include the following radicals: methyl, ethyl, n-propyl, i-propyl, n-butyl, sec-butyl, i-butyl, t-butyl, n-pentyl, sec-pentyl, isopentyl, n-hexyl, 1-, 2- or 3-methyl-pentyl, and long chain alkyl radicals, such as unbranched heptyl, octyl, nonyl and decyl, as well as the singly or multiply branched analogs thereof. Hydroxyalkyl radicals suitable in accordance with the invention are preferably hydroxyl-containing alkyl radicals as defined above. They may contain 1 to 10, preferably 1 to 3 and, in particular 1 hydroxyl group, and at least one hydroxyl group is preferably in terminal position, i.e., attached to a primary carbon atom.

Heteroalkyl radicals which can be used in accordance with the invention are alkyl groups as defined above in which at least one heteroatom, selected S, N and O, preferably O, is present in the alkyl chain. Examples of particularly preferred heteroalkyl groups are methoxymethyl and ethoxyethyl groups.

Hydroxyheteroalkyl groups which can be used in accordance with the invention are heteroalkyl groups as defined above in which at least 1 to 10, such as 1 to 3, hydroxyl groups, especially 1 hydroxyl group, are/is attached to the heteroalkyl chain. Possible examples of such radicals are hydroxyethyloxyethyl and hydroxymethyloxymethyl.

Abovementioned alkyl, hydroxyalkyl, heteroalkyl and hydroxyheteroalkyl groups in accordance with the invention may also, if desired, be attached to the aromatic ring by way of a heteroatom, preferably an oxygen atom.

In another preferred embodiment of the invention the antifreeze concentrates comprise as corrosion inhibitor at least one compound selected from triazoles, thiazoles, and mono- or polybasic, aliphatic or aromatic carboxylic acids or carboxylic salts, and mixtures of these compounds.

Examples of thiazoles and triazoles which can be used in accordance with the invention are derivatives of these compounds having a condensed, preferably aromatic ring system. Particular mention may be made of benzotriazole, benzothiazole, toluthiazole and tolutriazole.

The abovementioned thiazoles and triazoles may be present individually or in a mixture in the antifreeze concentrates of the invention. They may also be present as a mixture with at least one carboxylic acid of the type specified above.

Examples of carboxylic acids suitable in accordance with the invention are straight-chain or branched aliphatic monocarboxylic acids of 5 to 12 carbon atoms, examples being pentanoic, hexanoic, octanoic, nonanoic, decanoic, undecanoic, dodecanoic, 2-ethylhexanoic and isononanoic acid.

Aromatic monocarboxylic acids suitable in accordance with the invention are, in particular, those of 7 to 16 carbon atoms. Possible examples are benzoic acid, alkylbenzoic acids where the alkyl moiety is as defined above, such as o-, m- and p-methylbenzoic acid, and hydroxyl-containing analogs of the above aromatic monocarboxylic acids, such as o-, m- or p-hydroxybenzoic acid and o-, m- or p-(hydroxymethyl)benzoic acid.

The abovementioned carboxylic acids which can be employed in accordance with the invention may if desired be substituted additionally by groups containing ether oxygen, such as, for example, alkoxyalkyl groups, or by carbonyl-functional groups, such as alkylcarbonyl groups, the alkyl moiety in each case being as defined above.

The carboxylic acids utilizable in accordance with the invention can be added individually or as a mixture to the antifreeze concentrates of the invention. Particular preference is given to mixtures of at least two carboxylic acids of the abovementioned type. Two carboxylic acids are present preferably in a molar ratio of from about 1:99 to 99:1, in particular from 3:97 to 97:1. A particularly preferred mixture is that of two dicarboxylic acids, especially two aliphatic dicarboxylic acids, and/or their salts, especially alkali metal salts, such as sodium or potassium salts, for example.

Further carboxylic acid mixtures utilizable in accordance with the invention comprise a mixture of two monocarboxylic acids, especially of one aliphatic and one aromatic monocarboxylic acid, and mixtures of a monocarboxylic with a dicarboxylic acid, especially an aliphatic dicarboxylic acid with a branched aliphatic monocarboxylic acid.

As a specific example of a carboxylic acid mixture that can be used in accordance with the invention mention may be made of a mixture of sebacic and adipic acids.

Mixtures suitable in accordance with the invention and comprising carboxylic acids and triazole and/or thiazole compounds are described in the earlier EP-A-0 816 467, the content of which is expressly incorporated herein by reference. Suitable mixtures comprise, for example, at least one carboxylic acid of the type designated above and at least one thiazole or triazole of the type designated above, in a quantitative ratio of from about 1:20 to about 20:1, in particular from about 1:15 to about 15:1.

The antifreeze concentrates of the invention commonly include the reserve alkalinity donor(s) of the above formula I in a proportion of from about 0.05 to 4% by weight, preferably from about 0.5 to 3% by weight and, in particular, from about 0.8 to 2% by weight.

The abovementioned corrosion inhibitors, i.e., carboxylic acids, thiazoles and/or triazoles, are commonly present in an overall proportion of from about 0.1 to 20% by weight, in particular from 0.5 to 10% by weight, based on the overall weight of the concentrate. In this case the carboxylic acids of the type designated above may be present in a proportion of from about 0.05 to 10% by weight, preferably from 0.1 to 5% by weight, based on the overall weight of the concentrate. Triazoles and/or thiazoles are commonly present in a proportion of from 0.01 to 3% by weight, preferably from 0.05 to 1% by weight, based on the overall weight of the concentrate.

As additional corrosion inhibitors, the antifreeze concentrates of the invention may include up to 2% by weight, in particular from 0.001 to 1% by weight, based on the overall weight of the concentrate, of at least one quaternized imidazole. Such quaternized imidazoles are described in DE-A-196 05 509. Examples are benzyl chloride-, benzyl bromide-, methyl chloride-, methyl bromide-, ethyl chloride-, ethyl bromide-, diethyl sulfate- and, in particular, dimethyl sulfate-quaternized 1-methylimidazole, 1-ethylimidazole, 1-(β-hydroxyethyl)imidazole, 1,2-dimethylimidazole, 1-phenylimidazole, benzimidazole and in particular, N-vinylimidazole.

As further additional corrosion inhibitors, the antifreeze concentrates of the invention may include up to 2% by weight, in particular from 0.001 to 1% by weight, based on the overall weight of the concentrate, of at least one soluble magnesium salt of organic acids, especially carboxylic acids. Examples of such magnesium salts are magnesium benzenesulfonate, magnesium methanesulfonate, magnesium acetate and magnesium propionate.

In addition to the specified inhibitor components it is also possible, for example, for hydrocarbazoles to be employed, in customary amounts.

The antifreeze concentrates of the invention may additionally include up to 1% by weight, in particular from 0.01 to 0.5% by weight, based on the overall amount of concentrate, of hard water stabilizers based on polyacrylic acid, polymaleic acid, acrylic acid-maleic acid copolymers, polyvinylpyrrolidone, polyvinylimidazole, vinylpyrrolidone-vinylimidazole copolymers, and/or copolymers of unsaturated carboxylic acids and olefins.

The pH of the antifreeze concentrates of the invention lies customarily within the range from 7 to 10, preferably from 7.5 to 9.5 and, in particular, from 8.0 to 9.5. The desired pH is generally established by adding alkali metal hydroxide, ammonia or amines to the formulation, with solid sodium hydroxide and potassium hydroxide and also aqueous sodium and potassium hydroxide solutions being particularly suitable for the purpose.

The aliphatic or aromatic mono- and/or dicarboxylic acids are judiciously added directly as the corresponding alkali metal salts so as to lie automatically in the desired pH range. Alternatively, these carboxylic acids can be added as free acids, after which the formulation is neutralized with alkali metal hydroxide, ammonia or amines and the desired pH range is established. Similar comments apply to the reserve alkalinity donors of the formula I, which can be employed as alcohol or in the form of the corresponding alkali metal salts. Partial conversion of the compounds to their salts would be likewise conceivable.

Suitable liquid-alcoholic freezing-point reducers, which normally make up the majority (generally at least about 80% by weight, in particular about 90% by weight) of the antifreeze concentrates of the invention, are alkylene glycols or derivatives thereof, especially propylene glycol and, in particular, ethylene glycol. However, higher glycols and glycol ethers are also suitable, examples being diethylene glycol, dipropylene glycol, and glycol monoethers, such as the methyl, ethyl, propyl and butyl ether of ethylene glycol, propylene glycol, diethylene glycol and dipropylene glycol. It is also possible to use mixtures of these glycols and glycol ethers. Preference is given to ethylene glycol alone or to mixtures of alkylene glycols, i.e., ethylene glycol, propylene glycol, higher glycols and/or glycol ethers, containing at least 95% by weight of ethylene glycol.

The present invention provides, moreover, ready-to-use aqueous coolant compositions of reduced freezing point, especially for radiator protection in the automotive sector, which comprise water and from 10 to 90% by weight, preferably from 20 to 60% by weight, of the silicate- and borate-free antifreeze concentrates of the invention.

The present invention additionally provides for the use of compounds of the formula I as reserve alkalinity donors in coolant compositions based on alkylene glycols or alkylene glycol ethers, said coolant compositions being essentially free from silicate and borate.

The present invention is illustrated present by the following examples.

EXAMPLES a) The inventive antifreeze concentrates 2, 3 and 4 and the comparative concentrates C1, C5, C6 and C7 described in Table 1 were prepared and tested for their corrosion protection effect. The experimental data are summarized in attached Table 2.

TABLE 1

Composition of the antifreeze concentrates used

| | Example | | | | | | |
|---|---|---|---|---|---|---|---|
| | C1 | 2 | 3 | 4 | C5 | C6 | C7 |
| Monoethylene glycol | 93.32[3)] | 91.78 | 91.98 | 91.37 | 91.89 | 92.79 | 93.33 |
| NaOH, 50% | 2.98 | 3.52 | 3.32 | 3.43 | 3.41 | 2.61 | — |
| KOH, 50% | — | — | — | — | — | — | 2.97 |
| Sebacic acid[1)] | 2.8 | 2.8 | 2.8 | 2.8 | 2.8 | 1.4 | 0.25 |
| Adipic acid[2)] | 0.7 | 0.7 | 0.7 | 0.7 | 0.7 | — | — |
| 2-Ethylhexanoic acid | — | — | — | — | — | — | 3.25 |
| Isononanoic acid | — | — | — | — | — | 3.0 | — |
| Tolutriazole | 0.2 | 0.2 | 0.2 | 0.2 | 0.2 | 0.2 | 0.2 |
| 4,4'-Dihydroxydiphenyl sulfone | — | 1.0 | 1.0 | 1.5 | — | — | — |
| Borax | — | — | — | — | 1.0 | — | — |
| Total | 100.00 | 100.00 | 100.00 | 100.00 | 100.00 | 100.00 | 100.00 |

[1)]$HO_2C-(CH_2)_8-CO_2H$
[2)]$HO_2C-(CH_2)_4-CO_2H$
[3)]Parts by weight

TABLE 2

Technical data and test results

| | Example | | | | | | |
|---|---|---|---|---|---|---|---|
| | C1 | 2 | 3 | 4 | C5 | C6 | C7 |
| pH of concentrate | 8.5 | 9.1 | 8.5 | 8.5 | 8.5 | 8.3 | 8.4 |
| pH, 33% by vol. | 8.1 | 8.6 | 8.1 | 8.0 | 9.1 | 8.1 | 8.1 |
| Reserve alkalinity[1] | | | | | | | |
| to pH 7.0 | 0.5[2] | 6.9 | 3.5 | 5.0 | 11.5 | 0.5 | 0.3 |
| to pH 5.5 | 9.5 | 15.5 | 13.0 | 16.5 | 21.0 | 8.0 | 5.2 |
| Corrosion test[3] | | | | | | | |
| Copper | ±0.00[4] | +0.02 | −0.04 | −0.01 | ±0.00 | −0.01 | +0.00 |
| Soft solder | −0.02 | +0.01 | −0.05 | −0.04 | −0.19 | −0.02 | −0.07 |
| Brass | −0.10 | +0.02 | −0.02 | −0.03 | −0.01 | +0.01 | ±0.00 |
| Steel | −0.10 | +0.06 | −0.02 | −0.03 | +0.03 | +0.04 | ±0.00 |
| Gray cast iron | +0.08 | +0.09 | −0.06 | +0.01 | +0.06 | +0.09 | +0.04 |
| Cast aluminum | −0.28 | −0.19 | −0.19 | −0.19 | −1.01 | −0.46 | −0.32 |
| Hot corrosion test[5] $AlSi_{10}Mg$ | −26.4[6] | −43.6 | −23.1 | −25.1 | −1657.7 | −52.8 | −42.7 |

[1] In accordance with ASTM D 1121 (of 10 ml of concentrate)
[2] Amount (ml) of 0.1 N HCl consumed
[3] In accordance with ASTM D 1384 for 33% by volume solution in $H_2O$
[4] Weight change in $mg/cm^2$
[5] In accordance with MTU; for 20% by volume solution in $H_2O$
[6] Weight change in mg/sample The results set out in Table 2 from the determination of the reserve alkalinity in accordance with ASTM D 1121 clearly illustrate the effectiveness of the dihydroxydiphenyl sulfone additive employed in accordance with the invention. Although not quite achieving the level of effectiveness of borax (Example 5), the performance is outstanding relative to the formulations (Examples 1, 6, 7) without an additive of the invention.

The corrosion tests in accordance with ASTM D 1384 illustrate that additive treatment afforded to the radiator protectant formulations, in accordance with the invention, has no adverse effect on the corrosion behavior and that in the case of cast aluminum, indeed, a slight improvement can be obtained.

Table 2 also shows results obtained in the dynamic hot chamber corrosion test of the MTU (German Engine and Turbine Union), a test with elevated thermal loading. Here, a very high corrosion rate for the borax-containing formulation 5 is found whereas much lower values are found for the formulations of the invention, especially in Examples 3 and 4.

b) For the following series of tests an active substance concentrate in accordance with Example 7 of WO-A-96/18757 was prepared (monoethylene glycol 50.1 parts, 50% potassium hydroxide solution 24.9 parts, sorbic acid 20 parts and bisphenol S 5 parts) and was investigated in a corrosion test in accordance with ASTM D1384. For this test a 33% (v/v) solution of the mixture in distilled water was prepared, and 0.05 part by weight of tolutriazole was added. The results are summarized in Table 3 below.

TABLE 3

ASTM D1384 - Result

| Metals | Weight changes $mg/cm^2$ |
|---|---|
| Copper | −0.15 |
| Soft solder | −0.83 |
| Brass | −0.31 |
| Steel | −0.01 |
| Gray cast iron | +0.03 |
| Cast aluminum | −1.24 |

The results show that it is impossible to obtain satisfactory corrosion protection on the basis of a composition in accordance with WO-A-96/18757.

We claim:

1. An antifreeze concentrate which comprises a) at least one water-miscible alcohol which lowers the freezing point;

b) at least one corrosion inhibitor; and c) as reserve alkalinity donor, at least one mono- or polycyclic aromatic compound which has at least one hydroxyl group and a high buffer capacity in the pH range from about 6 to 10, which is selected from the group consisting of compounds of the formula III

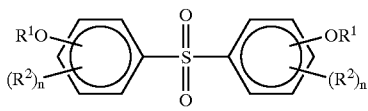

(III)

where
n is an integer from 0 to 4 and
R¹ is hydrogen or an alkali metal ion, and the substituents
R² independently of one another are a hydroxyl, alkyl, hydroxyalkyl, heteroalkyl or hydroxyheteroalkyl group.

2. An antifreeze concentrate as claimed in claim 1, wherein the reserve alkalinity donor is selected from the group consisting of 4,4'- and 2,4'-dihydroxydiphenyl sulfone and mixtures thereof.

3. An antifreeze concentrate as claimed in claim 1, which comprises at least one reserve alkalinity donor of the formula III in a proportion of from about 0.05 to 4% by weight, based on the overall weight of the concentrate.

4. An antifreeze concentrate as claimed in claim 1, wherein the corrosion inhibitor is at least one selected from the group consisting of triazoles, thiazoles, and mono- and polybasic, aliphatic and aromatic carboxylic acids and salts of said acids.

5. An antifreeze concentrate as claimed in claim 4, which comprises at least one corrosion inhibitor in a proportion of from about 0.1 to 20% by weight, based on the overall weight of the concentrate.

6. An antifreeze concentrate as claimed in claim 1, wherein the alcohol which lowers the freezing point is selected from the group consisting of alkylene glycols and alkylene glycol ethers, and mixtures thereof.

7. An antifreeze concentrate as claimed in claim 1, which is essentially free from borate and silicate.

8. A coolant composition comprising an antifreeze concentrate as claimed in claim 1.

9. A process for increasing the reserve alkalinity of a coolant composition comprising alkylene glycols, alkylene glycol ethers, or mixtures thereof, said process comprising adding to said coolant composition, a reserve alkalinity donor compound which is selected from the group consisting of compounds of the formula III

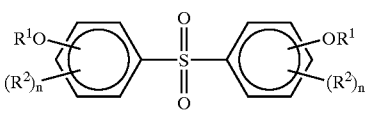

(III)

where
n is an integer from 0 to 4 and
R¹ is hydrogen or an alkali metal ion, and the substituents
R² independently of one another are a hydroxyl, alkyl, hydroxyalkyl, heteroalkyl or hydroxyheteroalkyl group.

10. The process of claim 9, wherein the coolant composition is essentially free from borate and silicate.

* * * * *

UNITED STATES PATENT AND TRADEMARK OFFICE
CERTIFICATE OF CORRECTION

PATENT NO. : 6,413,445 B1
DATED : July 2, 2002
INVENTOR(S) : Knut Oppenlaender et al.

It is certified that error appears in the above-identified patent and that said Letters Patent is hereby corrected as shown below:

<u>Title page,</u>
Item [30], the Foreign Application Priority Data should read:

-- [30] Foreign Application Priority Data

Jul. 9, 1998 (DE) ......................... 198 30 819 --

Signed and Sealed this

Twenty-first Day of January, 2003

JAMES E. ROGAN
*Director of the United States Patent and Trademark Office*